(12) United States Patent
Browne et al.

(10) Patent No.: US 7,013,538 B2
(45) Date of Patent: Mar. 21, 2006

(54) ELECTROACTIVE POLYMER RELEASABLE FASTENING SYSTEM AND METHOD OF USE

(75) Inventors: Alan Lampe Browne, Grosse Pointe, MI (US); William Barvosa-Carter, Ventura, CA (US); Nancy L. Johnson, Northville, MI (US); Leslie A. Momoda, Los Angeles, CA (US); Thomas B. Stanford, Port Hueneme, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/359,007

(22) Filed: Feb. 5, 2003

(65) Prior Publication Data

US 2004/0074069 A1    Apr. 22, 2004

Related U.S. Application Data

(63) Continuation-in-part of application No. 10/273,691, filed on Oct. 19, 2002.

(51) Int. Cl.
*A44B 21/00* (2006.01)

(52) U.S. Cl. .............. 24/603; 24/602; 24/604; 24/DIG. 44; 403/28; 403/410

(58) Field of Classification Search ............ 24/442, 24/450, 451, 452, 447, 448, 306, 572.1, 584.1, 24/589.1, 593.1, 598.1, 602, 603, 604, DIG. 44, 24/698.1, 697.1, 697.2; 428/100, 99; 403/28, 403/29, 410

See application file for complete search history.

(56) References Cited

U.S. PATENT DOCUMENTS

| | | | |
|---|---|---|---|
| 2,717,437 A | 9/1955 | DeMestral | 428/92 |
| 2,994,117 A | 8/1961 | McMullin | 24/201 |
| 3,101,517 A | 8/1963 | Fox et al. | 24/442 |
| 3,128,514 A | 4/1964 | Parker et al. | 24/11 HC |
| 3,138,749 A | 6/1964 | Shibitz | 318/135 |
| 3,176,364 A * | 4/1965 | Dritz | 24/306 |
| 3,292,019 A | 12/1966 | Hsu et al. | 310/328 |
| 3,365,757 A | 1/1968 | Billarant | 24/442 |
| 3,469,289 A * | 9/1969 | Whitacre | 24/450 |
| 3,490,107 A * | 1/1970 | Brumlik | 24/451 |
| 3,808,648 A | 5/1974 | Billarant et al. | 24/450 |
| 4,169,303 A | 10/1979 | Lemelson | 24/452 |
| 4,382,243 A | 5/1983 | Babitzka et al. | 335/219 |

(Continued)

FOREIGN PATENT DOCUMENTS

DE    199 56 011    6/2001

(Continued)

*Primary Examiner*—Jack W. Lavinder
(74) *Attorney, Agent, or Firm*—Kathryn A. Marra

(57) ABSTRACT

A releasable fastening system for retaining two surfaces at each other or disengaging the two surfaces from each other comprises a first electrode disposed at a first surface, a second electrode disposed at a second surface, and a polymer film disposed between the first and second electrode, and an electrolyte disposed in electrical communication with the first electrode, the polymer film, and the second electrode. A volume of the polymer film is controllably variable to cause the retention of the first surface at the second surface. A method of releasably fastening adjacently-positioned surfaces comprises disposing a first electrode at a first surface, disposing a second electrode at a second surface, and increasing the volume of an electrolyte disposed in electrical communication with the first electrode and the second electrode to cause the retention of the first surface at the second surface.

23 Claims, 2 Drawing Sheets

U.S. PATENT DOCUMENTS

| | | | |
|---|---|---|---|
| 4,391,147 A | 7/1983 | Krempl et al. ............... 73/730 |
| 4,634,636 A | 1/1987 | Yoshino et al. ............. 428/500 |
| 4,637,944 A | 1/1987 | Walker ......................... 428/35 |
| 4,642,254 A | 2/1987 | Walker ......................... 428/36 |
| 4,693,921 A | 9/1987 | Billarant et al. ............. 428/100 |
| 4,752,537 A | 6/1988 | Bhagwan ..................... 428/614 |
| 4,775,310 A | 10/1988 | Fischer ....................... 425/308 |
| 4,794,028 A | 12/1988 | Fischer ....................... 428/100 |
| 4,931,344 A | 6/1990 | Ogawa et al. ............... 428/100 |
| 5,037,178 A | 8/1991 | Stoy et al. ..................... 385/53 |
| 5,071,363 A * | 12/1991 | Reylek et al. ............... 439/291 |
| 5,133,112 A | 7/1992 | Gomez-Acevedo .......... 24/450 |
| 5,136,201 A | 8/1992 | Culp ........................... 310/328 |
| 5,182,484 A | 1/1993 | Culp ........................... 310/328 |
| 5,191,166 A | 3/1993 | Smirlock et al. ........... 89/36.02 |
| 5,212,855 A * | 5/1993 | McGanty ..................... 24/452 |
| 5,284,330 A | 2/1994 | Carlson et al. ......... 267/140.14 |
| 5,312,456 A | 5/1994 | Reed et al. ................... 24/442 |
| 5,319,257 A | 6/1994 | McIntyre .................... 310/328 |
| 5,328,337 A | 7/1994 | Kunta ......................... 417/310 |
| 5,474,227 A | 12/1995 | Krengel et al. .............. 228/147 |
| 5,486,676 A | 1/1996 | Aleshin ................. 219/121.63 |
| 5,492,534 A | 2/1996 | Athayde et al. ............. 604/141 |
| 5,497,861 A | 3/1996 | Brotz ........................... 188/267 |
| 5,547,049 A | 8/1996 | Weiss et al. ................. 188/267 |
| 5,611,122 A * | 3/1997 | Torigoe et al. ................ 24/442 |
| 5,656,351 A | 8/1997 | Donaruma ................... 428/100 |
| 5,657,516 A * | 8/1997 | Berg et al. .................... 24/452 |
| 5,669,120 A | 9/1997 | Wessels et al. ............... 24/446 |
| 5,671,498 A | 9/1997 | Martin et al. ............... 15/244.3 |
| 5,699,120 A | 12/1997 | Wessels et al. |
| 5,712,524 A | 1/1998 | Suga ........................... 310/328 |
| 5,725,928 A | 3/1998 | Kenney et al. .............. 428/100 |
| 5,797,170 A | 8/1998 | Akeno ......................... 24/452 |
| 5,798,188 A * | 8/1998 | Mukohyama et al. ......... 429/34 |
| 5,814,999 A | 9/1998 | Elie et al. .................... 324/662 |
| 5,816,587 A | 10/1998 | Stewart et al. ........... 280/5.516 |
| 5,817,380 A | 10/1998 | Tanaka ....................... 428/100 |
| 5,885,652 A | 3/1999 | Abbott et al. ............. 427/163.2 |
| 5,945,193 A | 8/1999 | Pollard et al. ............... 428/100 |
| 5,969,518 A | 10/1999 | Merklein et al. ........... 324/173 |
| 5,974,856 A | 11/1999 | Elie et al. ................... 73/11.04 |
| 5,979,744 A | 11/1999 | Brigleb ................... 229/87.01 |
| 5,983,467 A | 11/1999 | Duffy .......................... 24/442 |
| 6,029,783 A | 2/2000 | Wirthlin ................. 188/267.1 |
| 6,086,599 A | 7/2000 | Lee et al. .................... 606/108 |
| 6,102,912 A | 8/2000 | Cazin et al. ................... 606/61 |
| 6,102,933 A | 8/2000 | Lee et al. .................... 606/209 |
| 6,129,970 A | 10/2000 | Kenney et al. .............. 428/100 |
| 6,148,487 A | 11/2000 | Billarant ...................... 24/442 |
| 6,156,842 A | 12/2000 | Hoenig et al. .............. 525/171 |
| 6,203,717 B1 | 3/2001 | Munoz et al. ........... 252/62.52 |
| 6,257,133 B1 | 7/2001 | Anderson ............... 100/162 B |
| 6,388,043 B1 | 5/2002 | Langer et al. ................. 528/80 |
| 6,454,923 B1 * | 9/2002 | Dodgson et al. ............ 204/415 |
| 6,460,230 B1 | 10/2002 | Shimamura et al. .......... 24/452 |
| 6,502,290 B1 | 1/2003 | Tseng ........................... 28/161 |
| 6,544,245 B1 | 4/2003 | Neeb et al. .................... 24/442 |
| 6,546,602 B1 * | 4/2003 | Eipper et al. ................. 24/442 |
| 6,593,540 B1 | 7/2003 | Baker et al. ........... 219/121.63 |
| 6,598,274 B1 | 7/2003 | Marmaropoulos ........... 24/451 |
| 6,605,795 B1 | 8/2003 | Arcella et al. ......... 219/121.63 |
| 6,628,542 B1 | 9/2003 | Hayashi et al. ............. 365/158 |
| 6,681,849 B1 | 1/2004 | Goodson ................... 166/66.5 |
| 6,740,094 B1 | 5/2004 | Maitland et al. ............ 606/108 |
| 6,742,227 B1 | 6/2004 | Ulicny et al. ................. 24/442 |
| 6,766,566 B1 | 7/2004 | Cheng et al. ................. 24/452 |
| 6,797,914 B1 | 9/2004 | Speranza et al. ...... 219/121.64 |
| 6,815,873 B1 | 11/2004 | Johnson et al. ............. 310/331 |
| 2002/0007884 A1 | 1/2002 | Schuster et al. |
| 2002/0050045 A1 | 5/2002 | Chiodo et al. |
| 2002/0062547 A1 | 5/2002 | Chiodo et al. ............. 29/426.5 |
| 2002/0076520 A1 | 6/2002 | Neeb et al. .................. 428/100 |
| 2002/0142119 A1 | 10/2002 | Seward et al. ............. 428/36.9 |
| 2003/0120300 A1 | 6/2003 | Porter ......................... 606/191 |
| 2004/0025639 A1 | 2/2004 | Shahinpoor et al. .......... 75/722 |
| 2004/0033336 A1 | 2/2004 | Schulte ....................... 428/100 |
| 2004/0074061 A1 | 4/2004 | Ottaviani et al. ............. 24/442 |
| 2004/0074062 A1 | 4/2004 | Stanford et al. .............. 24/442 |
| 2004/0074063 A1 | 4/2004 | Golden et al. ................ 24/442 |
| 2004/0074064 A1 | 4/2004 | Powell et al. ................. 24/442 |
| 2004/0074067 A1 | 4/2004 | Browne et al. ............... 24/442 |
| 2004/0074068 A1 | 4/2004 | Browne et al. ............... 24/442 |
| 2004/0074070 A1 | 4/2004 | Momoda et al. ............. 24/442 |
| 2004/0074071 A1 | 4/2004 | Golden et al. ................ 24/442 |
| 2004/0117955 A1 | 6/2004 | Barvosa-Carter et al. ..... 24/442 |

FOREIGN PATENT DOCUMENTS

| | | |
|---|---|---|
| EP | 0385443 | 9/1990 |
| EP | 0673709 | 9/1995 |
| JP | 401162587 | 6/1989 |
| JP | 4-314446 | 4/1992 |
| JP | 4-266970 | 9/1992 |
| JP | 08260748 | 10/1996 |
| WO | WO 97/20480 | 6/1997 |
| WO | WO 99/42528 | 8/1999 |
| WO | WO 00/62637 | 10/2000 |
| WO | WO 01/84002 | 5/2001 |
| WO | WO 01/84002 | 11/2001 |
| WO | WO 02/45536 | 6/2002 |
| WO | WO 03/085273 A1 | 10/2003 |

* cited by examiner

ELECTROACTIVE POLYMER RELEASABLE FASTENING SYSTEM AND METHOD OF USE

CROSS REFERENCE TO RELATED APPLICATIONS

This application is a continuation-in-part of U.S. application Ser. No. 10/273,691 filed Oct. 19, 2002, which is incorporated herein by reference in its entirety.

BACKGROUND

This disclosure relates to releasable attachment devices of the type used to fasten, retain, or latch together components of an apparatus or a structure that are to be separated or released under controlled conditions, and, more particularly, to a fastening system that utilizes a selectively releasable mechanism wherein the selective releasability is based on the application of a potential to an electrolytically activatable polymer film.

Various types of separable fasteners may be used to detachably join a plurality of members to each other. One type of such fasteners is a hook-and-loop fastener, which generally comprises two components disposed on opposing member surfaces. One component typically includes the hook portion, while the other component typically includes the loop portion. When the two components are biased together they interlock to form a releasable engagement. The interlocking of the components is based on the mechanical engagement of each part with the other part. The resulting joint created by the engagement is relatively resistant to shear and pull forces, and weak in peel strength forces. As such, the disengagement of the components by peeling one component from the other component can be used to separate the components with a minimal applied force. As used herein, the term "shear" refers to an action or stress resulting from applied forces that causes or tends to cause two contiguous parts of a body to slide relative to each other in a direction parallel to their plane of contact. The term "pull force" refers to an action or stress resulting from applied forces that causes or tends to cause two contiguous parts of a body to move relative to each other in a direction normal to the plane of contact of the parts.

SUMMARY

Disclosed herein is a releasable fastening system for retaining two surfaces at each other or disengaging the two surfaces from each other. The system comprises a first electrode disposed at a first surface, a second electrode disposed at a second surface, a polymer film disposed between the first and second electrodes, and an electrolyte disposed in electrical communication with the first electrode, the polymer film, and the second electrode. A volume and/or configuration of the polymer film is controllably variable to cause the retention of the first surface at the second surface. One embodiment of the system is an electro-activatable releasable fastening system that comprises a first electrode disposed at a first surface, a second electrode disposed at a second surface, a polymer film disposed between the first and second electrodes, and an electrolyte disposed in electrical communication with the first electrode, the polymer film, and the second electrode, such that the polymer film is electro-activatable in response to a voltage applied to the electrodes to effect the controlled engagement of the first surface and the second surface.

A method of releasably fastening adjacently-positioned surfaces comprises disposing a first electrode at a first surface, disposing a second electrode at a second surface, disposing a polymer film between the first and second electrodes, disposing an electrolyte in electrical communication with the first and second electrode and the polymer film, and increasing the volume of a polymer film disposed between the first and second electrodes to cause the retention of the first surface at the second surface.

Also disclosed herein is a releasable fastening system which comprises a first electrode disposed at a first surface, a second electrode disposed at a first surface, and a polymer film disposed disposed between the first electrode and the second electrode. A configuration of the polymer film is controllably variable to cause the retention of the first surface at a second surface. One embodiment of the system is an electro-activatable releasable fastening system that comprises a first electrode disposed at a first surface, a second electrode disposed at a first surface, and a polymer film disposed between the first electrode and the second electrode such that the electrolyte is electro-activatable in response to a voltage applied to the electrodes to effect the controlled engagement of the first surface and a second surface. A mechanically electro-activatable embodiment of the system comprises a working electrode disposed at a first surface, a non-compliant electrode disposed at the first surface, and a polymer disposed in contact with the working electrode and the non-compliant electrode. The non-compliant electrode has an opening defined therein, and the polymer is compressible such that the polymer is expandable through the opening in the compliant electrode to engage a second surface.

A method of releasably fastening adjacently-positioned surfaces comprises disposing a first electrode at a first surface, disposing a second electrode at a second surface, disposing a polymer film between the first and second electrodes, and changing the configuration of the polymer film to cause the retention of the first surface at the second surface.

The above-described and other features are exemplified by the following figures and detailed description.

BRIEF DESCRIPTION OF THE DRAWINGS

Referring now to the figures, which are exemplary embodiments and wherein the like elements are numbered alike.

DETAILED DESCRIPTION

A releasable fastening system made operable through an electrolytically activated polymer film that provides for the controlled engagement of adjacently-positioned surfaces to be joined together to define a "smart" apparatus and a method for the attachment of the surfaces is disclosed herein. In one embodiment, the controlled engagement is effected by the electrolytic activation (hereinafter the "electro-activation") of the film such that the oxidation and/or ionic uptake of the film material is varied, which causes the volume of the film to accordingly increase or decrease and to retain two surfaces in a substantially fixed relationship. In another embodiment, the controlled engagement is effected by the electro-activation of the film causing the configuration of the film to change such that the film is forced into contact with a second surface, which causes the retention of the surfaces in a substantially fixed relationship. By disposing the film at the interfaces of the surfaces to be attached and varying its volume or configuration, the mechanical engagement of the surfaces is controlled to provide for the engagement or disengagement of the surfaces. Surfaces that can be engaged or disengaged include, but are not limited to, joints and other points of attachment.

Figure 1:
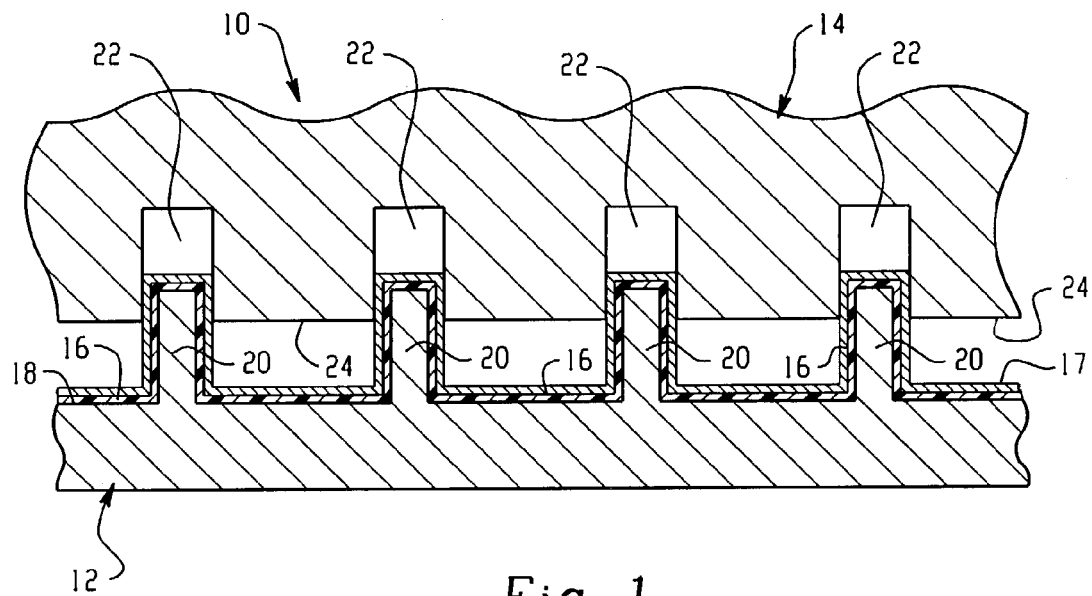
FIG. 1 is a cross-sectional view of an electrolytically activatable releasable fastening system.

Referring now to FIG. 1, one exemplary embodiment of a releasable fastening system made operable through an electro-activated polymer film is shown generally at 10 and is hereinafter referred to as "system 10." System 10 comprises a connecting block 12 and a receiving block 14. Connecting block 12 comprises a plurality of male-oriented protrusions, and receiving block 14 comprises a corresponding plurality of female-oriented receptacles, which are preferably configured to receive the male protrusions. Both connecting block 12 and receiving block 14 function as electrodes. An electro-activatable film is disposed at a surface of connecting block 12 as well as at the surfaces of the male protrusions. Alternately, the electro-activatable film may also be deposited over receiving block 14 and the cavities thereon. Furthermore, an electrolyte 17 is also disposed over this film and upon assembly of connecting block 12 and receiving block 14, is in communication with both electrodes. Upon the mechanical biasing together of connecting block 12 and receiving block 14 such that the male protrusions are received into corresponding receptacles, an electrical potential is disposed across blocks 12, 14. The application of voltage through the polymer film is such that the polymer material expands to fill any voids between the surfaces of blocks 12, 14 to compensate for the tolerances between the male protrusions and the female receptacles. By selectively applying the voltage, the polymer film can be controllably expanded and contracted, thereby effecting the selective frictional retention of one block at the other block and the selective engagement and disengagement of blocks 12, 14.

One exemplary embodiment of connecting block 12 comprises a substrate member having an engagement surface 18. A plurality of posts 20 (male-oriented protrusions) extend in a generally orthogonal direction from engagement surface 18. Each post 20 is preferably round in cross-sectional configuration. Other cross-sectional configurations of posts 20 include, but are not limited to, multisided (e.g., rectangular), elliptical, combinations of the foregoing shapes, and the like. Posts 20 may be integrally formed with the substrate member, or they may be attached thereto via any type of attachment method including, but not limited to, welding, brazing, and the like. Materials from which connecting block 12 may be fabricated include, but are not limited to, metals such as silver, gold, platinum, copper, aluminum or steel, thermoplastic polymers such as polypropylene, polyethylene, polyamide, polyester, polystyrene, polyvinyl chloride, acetal, acrylic, polycarbonate, polyphenylene oxide, polyurethane, polysulfone, and the like, and thermoset materials such as various epoxies, and phenol-formaldehyde, polyester, silicone, and polyurethane resins, and the like, and combinations of the foregoing materials.

The electrolyte 17 disposed at posts 20 and at engagement surface 18 from which posts 20 extend provides electrochemical communication between connecting block 12 and receiving block 14 and provides a conductive medium through which ions may be exchanged to effect the electro-activation of system 10. The electrolyte 17 may be a film of ionic liquid or an aqueous solution or solid polymer electrolyte. Polymer film 16 is electrolytically activatable by the application of the applied voltage, i.e., the application of voltage to the polymer results in the controllable volumetric expansion of the polymeric structure. Upon the application of voltage to polymer film 16, the molecular composition of the polymer is altered, thereby changing the volume of the polymer material. In particular, as the electrical current is applied to polymer film 16, ions migrate from the electrolyte into the polymer film, thereby causing the distance between each polymer molecule to be increased, and the polymer thereby expands to fill the voids that result from the tolerances in the engagement of posts 20 and the female receptacles. Upon reversal of the voltage, the molecular composition of the polymer returns to its original form, thereby causing the contraction of polymer film 16. The reduction in volume of polymer film 16 therefore reopens the voids that result from the tolerances in the engagement of posts 20 and the female receptacles, and system 10 disengages to release connecting block 12 from receiving block 14. Preferably, polymer film 16 comprises a polypyrrole film electrochemically deposited. Replenishment of the electrolyte 17 may be required upon subsequent repeated engagement/disengagement of posts 20 and the female receptacles.

Receiving block 14 serves as the counter-electrode for the electro-activation of polymer film 16. One exemplary embodiment of receiving block 14 comprises a substrate member having an engagement surface 24 in which the female receptacles (hereinafter "cavities 22") are disposed. Engagement surface 24 is preferably engagable with engagement surface 18 of connecting block 12. Cavities 22 preferably correspond in cross-sectional configuration to posts 20, but are preferably larger (in cross-section) and deeper to loosely accommodate posts 20 and polymer film 16 in its un-activated state. Both posts 20 and cavities 22 are preferably ordered (e.g., evenly-spaced) to minimize the relative displacement between the substrate members and to obtain the proper engagement of blocks 12, 14. In other exemplary embodiments, posts 20 and cavities 22 may be disposed at their respective engagement surfaces 18, 24 in arrangements of increasing or decreasing density to enhance the ease of engaging blocks 12, 14 and to make the engagement less sensitive to alignment.

During engagement of blocks 12, 14, either block is biased in the direction of the other block such that engagement surfaces 18, 24 are disposed in intimate contact with each other. Alternately, both blocks 12, 14 may be simultaneously biased in the direction of the other block such that intimate contact is maintained between engagement surfaces 18, 24. The engagement of blocks 12, 14 creates an interfacial joint that is strong when one of the blocks is subject to shear or subject to a pull force, but which may be weaker when one of the blocks is subject to a force exerted at an angle away from the other block (a peeling force). For example, when blocks 12, 14 are pressed into facial engagement, posts 20 engage with cavities 22 such that the close substantial lateral movement is prevented when subjected to shearing forces in the directions of the plane of engagement. Similarly, when polymer film 16 is activated and the engaged facial surfaces are subjected to a force orthogonal to this plane (pull-off forces), the expansion of polymer film 16 resists the disengagement of posts 20 from cavities 22. However, when one block is subjected to a peeling force relative to the other block, posts 20 can become more easily disengaged from cavities 22. In order to provide a point of leverage for separating blocks 12, 14 using a peeling force, either block 12 or block 14 is preferably flexible. Alternately, posts 20 may be flexible or flexibly disposed at engagement surface 18.

Figure 2:
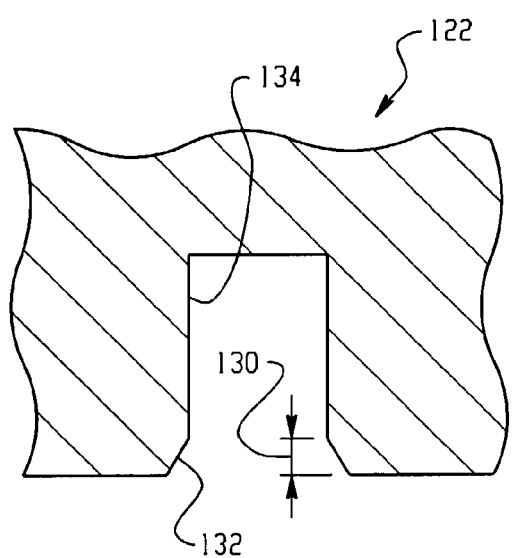
FIG. 2 is a cross-sectional view of a cavity electrode of a releasable fastening system having an alignment means.

In FIG. 2, one exemplary embodiment of a cavity is shown at 122. Cavity 122, which preferably corresponds in cross-sectional geometry with the cross-sectional geometry of the post (not shown), comprises an alignment means 130 disposed at an entrance of cavity 122. Alignment means 130 comprises a surface 132 that is chamfered with respect to an inner wall 134 of cavity 122 at an angle of about two hundred twenty-five degrees. The chamfered surface 132 compensates for the misalignment of the post upon the initial engagement of the post with cavity 122 and facilitates the insertion of the post into cavity 122. The retention of the post in cavity 122 is preferably facilitated by the electro-activation of a polymer film disposed on the post. As with the embodiment described above, activation of the polymer film, which increases in volume in response to an applied current, effects the frictional retention of the post in cavity 122.

Figure 3:
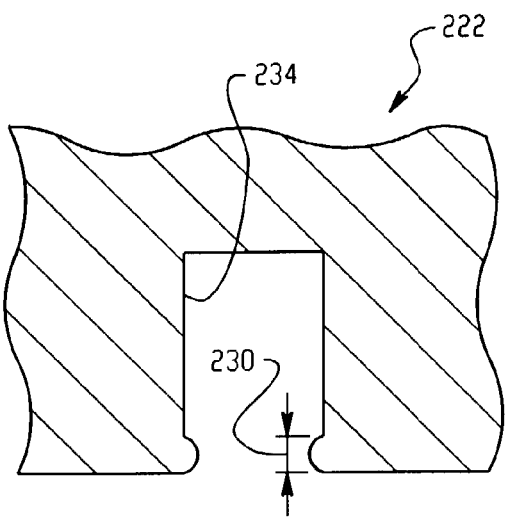
FIG. 3 is a cross-sectional view of a cavity electrode of a releasable fastening system having a mechanical retention means.

Referring to FIG. 3, another exemplary embodiment of a cavity is shown at 222. Cavity 222 comprises a mechanical means to facilitate the retention of a post (not shown) in cavity 222. The mechanical means preferably comprises a fillet 230 disposed at an inner defining wall 234 of cavity 222. Fillet 230 preferably extends completely around defining wall 224 of cavity 222. Exemplary fillets that may be disposed at cavity 222 include, but are not limited to, a rounded bead (as shown), angular surfaces that extend parallel and perpendicular to defining wall 234 of cavity 222, surfaces that are angled to define an increasingly smaller opening of cavity 222, or any combination of the foregoing configurations. In either configuration, the retention of the post in cavity 222 and at fillet 230 is facilitated by the activation of a polymer film disposed on the inserted post. Activation of the film, which increases in volume in response to an applied current, facilitates and further enhances the frictional retention of the post at fillet 230.

Figure 4:
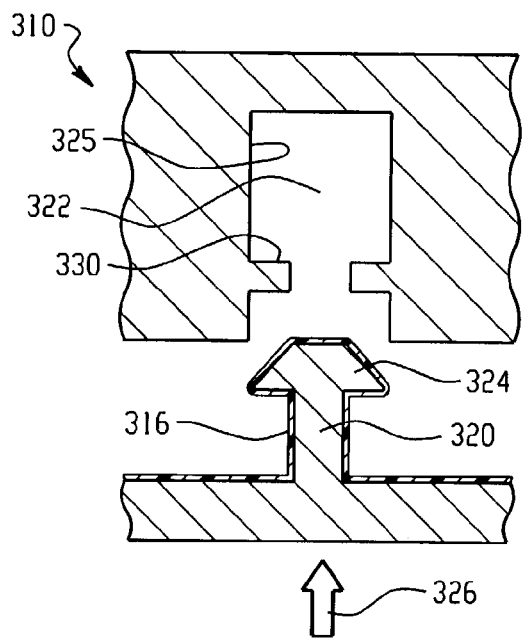
FIGS. 4 and 5 are cross-sectional views of the insertion of a post electrode into a cavity electrode and the mechanical retention of the post electrode in the cavity electrode.
Figure 5:
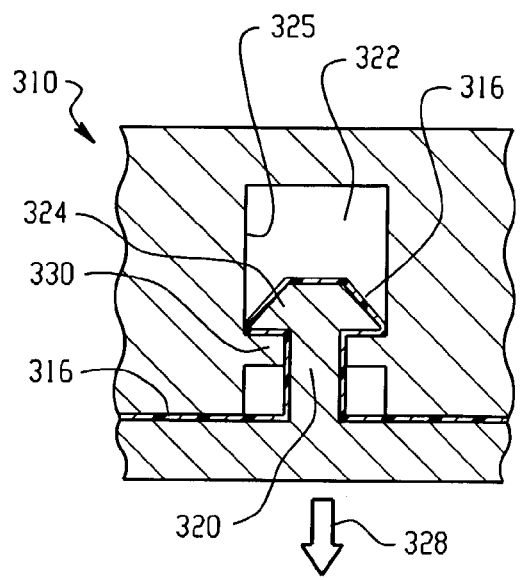

Referring now to FIGS. 4 and 5, yet another exemplary embodiment of a releasable fastening system is shown at 310 and is hereinafter referred to as "system 310." System 310 comprises a post 320 and a cavity 322. Either or both post 320 or cavity 322 may be configured to include an irregularity to provide a means for the mechanical interlock of post 320 and cavity 322 upon activation of polymer film 316. One such means may comprise a flexible knobbed member 324 disposed at the end of post 320. Flexible knobbed member 324 may be configured such that its mechanical insertion into cavity 322 is easily effected but such that its removal warrants a significant amount of force. For example, flexible knobbed member 324 may be a barb or similar structure that flexes when post 320 is directionally inserted (indicated by an arrow 326) into the opening defined by cavity 322, but resists flexing when subjected to a force (indicated by an arrow 328) exerted from the opposite direction because of the engagement of flexible knobbed member 324 with an engagement surface 330, e.g., a lip in a defining wall 325 of cavity 322. Activation of polymer film 316 provides additional frictional resistance to the removal of post 320 from cavity 322.

Another configuration may include a "T-shaped" post in which the cross-member of the "T" comprises a non-compliant working electrode disposed around an electro-activatable film disposed in contact with an electrolyte. In such a configuration, the "T" functions as a counterelectrode. Activation of the film causes its elongation. The protruding edges of the film are received at surfaces (e.g., holes, channels, ridges, or the like) disposed in the walls of the cavity to effect the latching of the post in the cavity.

Figure 6:
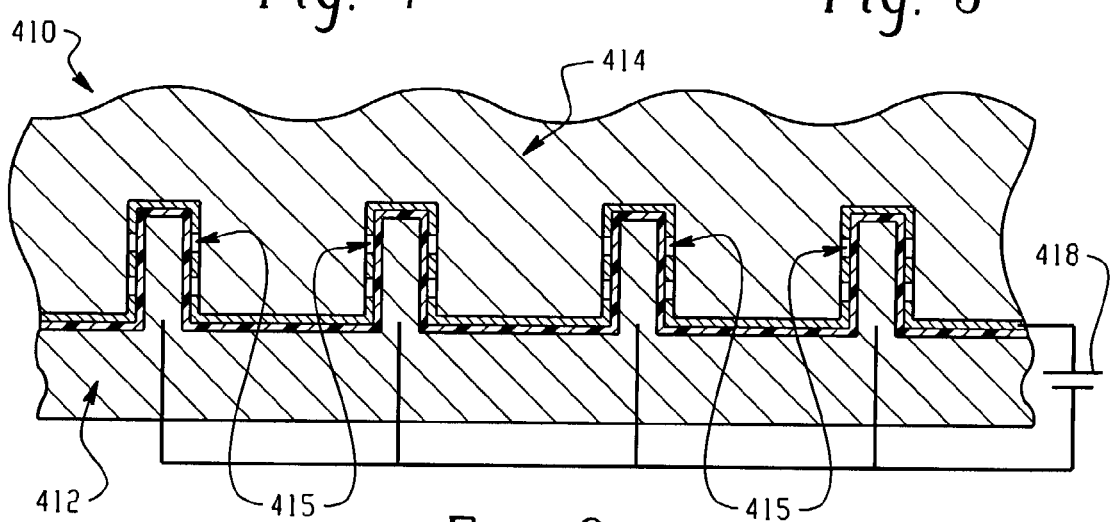
FIG. 6 is a cross-sectional view of a releasable fastening system in which a compliant electrode is electrolytically activatable such that an electrolyte is extruded through the compliant electrode.

Another exemplary embodiment of a releasable fastening system made operable through an electro-activated mechanism is shown at 410 with reference to FIG. 6. In the releasable fastening system 410, hereinafter referred to as "system 410," a non-compliant electrode assembly 415 is disposed at a surface of a connecting block 412. A voltage is applied to electrode assembly 415 from a voltage source 418 to cause the attraction of the two electrodes, which in turn causes the compression of a flexibly solid dielectric disposed between the electrodes. Upon compression of the flexible solid dielectric, the dielectric polymer 416 is extruded through openings in one of the electrodes (preferably the non-compliant electrode) such that the electrolyte frictionally engages a surface of a cavity in a receiving block 414 to retain connecting block 412 at receiving block 414.

Figure 7:
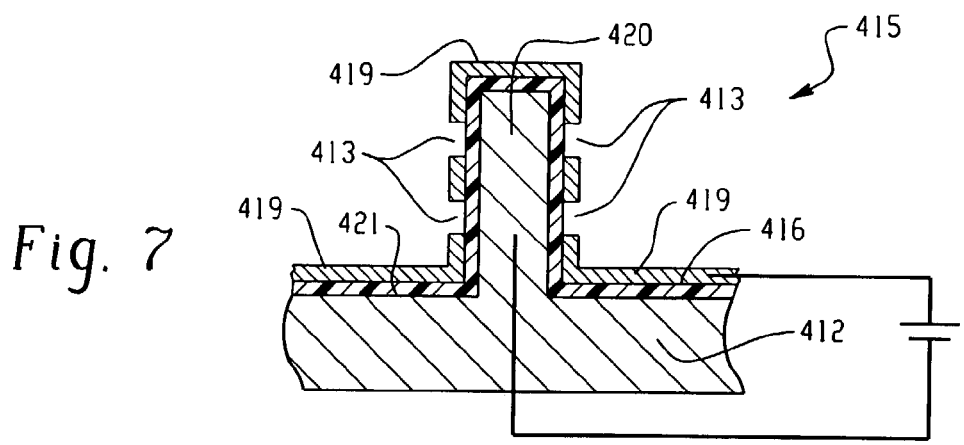
FIG. 7 is a cross-sectional view of the electrode assembly system of the system of FIG. 6.

Referring now to FIG. 7, electrode assembly 415 is shown. The first electrode comprises a post 420 that extends from an engagement surface 421 of connecting block 412. Post 420 is preferably fabricated from an electrically conductive material (e.g., steel, and more preferably stainless steel). The flexibly solid electrolyte is preferably a dielectric polymer 416 that is chemically bonded or similarly disposed at an outer surface of post 420. The second electrode, shown as a non-compliant electrode 419, is disposed at an outer surface of dielectric polymer 416. Post 420 and its attendant dielectric polymer 416 and non-compliant electrode 419 are received into the cavity disposed in the receiving block.

Dielectric polymer 416 is elastically deformable in response to a biasing force. The resiliency of dielectric polymer 416 accommodates the biasing force of non-compliant electrode 419 and allows for the repeated engagement and disengagement of connecting block 412 and the receiving block through numerous cycles. Materials from which dielectric polymer 416 can be fabricated include, but are not limited to, elastomers (e.g., silicon rubber), epoxies, polyester resins, phenol-formaldehyde resins, polyurethanes, polypropylenes, polyethylene, polyamides, polyesters, polystyrenes, polyvinyl chlorides, acetals, acrylics, and polycarbonates.

Non-compliant electrode 419 comprises a perforated structure disposed at the exposed surface of dielectric polymer 416. Openings 413 are disposed in the structure to provide the perforations through which dielectric polymer 416 is extruded upon the electro-activation of non-compliant electrode 419 in response to the application of a voltage. Non-compliant electrode 419 is fabricated from a material such that upon the application of a voltage, the electrode is attracted to post 420 to restrict the space between an inner surface of non-compliant electrode 419 and an outer surface of post 420, thereby forcing dielectric polymer 416 to extrude through openings 413. Materials from which non-compliant electrode 419 may be fabricated include, but are not limited to silver, gold, platinum, copper, aluminum or steel. Upon dielectric polymer 416 being extruded through openings 413, dielectric polymer 416 engages the inner surface of the cavity to provide frictional resistance to movement between the outer surface of the post/dielectric polymer/non-compliant electrode structure (electrode assembly 415) and the cavity.

EXAMPLE

One exemplary embodiment of an elastomeric material having suitable dielectric properties that may be utilized as an electro-activatable polymer film comprises silicone rubber. Preferably, the silicone rubber is an RTV silicone such as General Electric RTV 118. The film may formed as a free standing film by casting the elastomeric material onto a clean smooth surface to which the material will not adhere (e.g., polytetrafluoroethylene). A film of uniform thickness may be formed using a doctor blade or by dragging a straight edge across the material. A film thickness of about 4 mil (0.1 mm) thick film is typically achieved with this approach. The film is then thoroughly cured and a thin film of carbon grease is applied to the electrode. The carbon grease may be powdered graphite or a powdered graphite suspended in silicone oil, such as CIRCUITWORKS Carbon Conductive Grease (CW7200) which is commercially available from ITW Chemtronics of Kennesaw, Ga. A second electrode is similarly attached on the other side of the film.

A conductive polymer that may be utilized to provide the electrolytic medium for the electro-activation of a releasable fastening system may comprise a polypyrrole film. An acetonitrile solution of 0.2 molar (M) pyrrole in 0.1 M lithium perchlorate ($LiClO_4$) is prepared. The polypyrrole film is electrochemically deposited onto a substrate by immersing a working electrode (e.g., a stainless steel post) in the pyrrole $LiClO_4$ solution and applying a square wave voltage between −300 millivolts (mV) and 850 mV. The electrochemical deposition is carried out under a nitrogen atmosphere. The thickness of the polypyrrole film deposited is a function of the voltage sweep rate, the number of sweeps, and the concentration of the pyrrole monomer. Effective film thicknesses are from about 5 micrometers (um) to about several hundred um. Once the film is deposited, the working electrode is removed from the electrolytic solution, rinsed in acetonitrile, and air-dried. Other electrolytic solutions that may be utilized to deposit the polypyrrole film include, but are not limited to, inorganic salts in acids (e.g., sodium carbonate in sulfuric acid) and ionic solutions (e.g., 1-butyl-4-methylpyridinium hexafluoro phosphate), and the like.

The releasable fastening system as described above is extremely versatile and can be utilized in a wide variety of applications. For example, the releasable fastening system can be employed to releasably attach two or more automotive structural elements together. Welded and adhesively bonded "rigid" attachments provide fixed load paths. By applying or removing a current to an electro-activatable polymer, however, load paths can be selectively created or eliminated. The selective creation of a load path may provide an additional force to maintain the integrity of a structure subjected to a stressing force, and the selective elimination of the load path may be used to provide for the controlled failure of a structure when subjected to a stressing force. Other examples include providing alternative mechanisms for powered locking/unlocking of devices and alternative methods for the opening and closing of apparatuses such as trunks, doors, glove box, and the like. The releasable fastening system may also be employed for releasable on-demand attachment mechanisms such as for releasable attachment for batteries, fuels cells, cargo containers, vehicle interior and exterior components, and the like. Moreover, the releasable fastening systems can be configured such that an energy source is not required to maintain engagement of the joint. Energy, i.e., the signal supplied by the actuation device, can be used to provide separation, thereby minimizing the impact on energy sources during use of the releasable fastening system.

While the invention has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the invention not be limited to the particular embodiment disclosed as the best mode contemplated for carrying out this disclosure, but that the disclosure will include all embodiments falling within the scope of the appended claims.

What is claimed is:

1. A releasable fastening system, comprising:
a first electrode disposed at a first surface;
a second electrode disposed at a second surface;
a polymer disposed between said first and second electrodes, a volume of said polymer being controllably variable to cause the retention of said first surface at said second surface; and
an electrolyte disposed in electrical communication with said first electrode and said second electrode.

2. The releasable fastening system of claim I, wherein the volume of said polymer is controllably variable in response to a voltage applied to said electrodes.

3. The releasable fastening system of claim 2, wherein said polymer is a film, said film being electro-activatable in response to said current applied to said electrodes.

4. An electro-activatable releasable fastening system, comprising:
a first electrode disposed at a first surface;
a second electrode disposed at a second surface;
an electrolyte disposed in electrical communication with said first electrode and said second electrode; and
a polymer film disposed between said first and second electrodes, said polymer film being electro-activatable in response to a voltage applied to said electrodes to effect the controlled engagement of said first surface and said second surface.

5. The electro-activatable releasable fastening system of claim 4, wherein said polymer film is conductive.

6. The electro-activatable releasable fastening system of claim 5, wherein said polymer film is polypyrrole.

7. The electro-activatable releasable fastening system of claim 4, wherein said electrolyte is an ionic liquid film.

8. The electro-activatable releasable fastening system of claim 4, wherein said first electrode comprises a post and said second electrode comprises a cavity configured to receive said post.

9. The electro-activatable releasable fastening system of claim 8, further comprising an alignment means disposed at said cavity to facilitate the receiving of said post at said cavity.

10. The electro-activatable releasable fastening system of claim 9, wherein said alignment means comprises a chamfered surface disposed at a mouth of said cavity.

11. The electro-activatable releasable fastening system of claim 8, wherein said post is retainable at said cavity via a mechanical means.

12. The electro-activatable releasable fastening system of claim 11, wherein said mechanical means comprises a fillet disposed at said cavity.

13. The electro-activatable releasable fastening system of claim 8, wherein said post comprises a knobbed member disposed at an end thereof, said knobbed member being engagable with an interlock surface disposed at said cavity.

14. A releasable fastening system, comprising:
- a first electrode disposed at a first surface;
- a second electrode disposed at the first surface; and
- a polymer disposed between said first and second electrodes, a configuration of said polymer being controllably variable to cause retention of said first surface at a second surface wherein said polymer has a volume dimension that is controllably variable in response to a voltage applied to said electrodes.

15. The releasable fastening system of claim 14, wherein said polymer is a film, said film being electro-activatable in response to said voltage applied to said electrodes.

16. An electro-activatable releasable fastening system, comprising:
- a first electrode disposed at a first surface;
- a second electrode disposed at a first surface; and
- a polymer film disposed between said first and second electrodes, said polymer film being electro-activatable in response to a voltage applied to said electrodes to effect the controlled engagement of said first surface and a second surface.

17. The electro-activatable releasable fastening system of claim 16, wherein said polymer film is silicone dielectric.

18. The electro-activatable releasable fastening system of claim 16, wherein said first electrode and second electrode comprise a post and said second surface comprises a cavity configured to receive said post.

19. The electro-activatable releasable fastening system of claim 18, further comprising an alignment means disposed at said cavity to facilitate the receiving of said post at said cavity.

20. The electro-activatable releasable fastening system of claim 19, wherein said alignment means comprises a chamfered surface disposed at a mouth of said cavity.

21. The electro-activatable releasable fastening system of claim 18, wherein said post is retainable at said cavity via a mechanical means.

22. The electro-activatable releasable fastening system of claim 21, wherein said mechanical means comprises a fillet disposed at said cavity.

23. The electro-activatable releasable fastening system of claim 18, wherein said post comprises a knobbed member disposed at an end thereof, said knobbed member being engagable with an interlock surface disposed at said cavity.

* * * * *